(12) United States Patent
Gannon et al.

(10) Patent No.: US 7,896,570 B2
(45) Date of Patent: Mar. 1, 2011

(54) LINEAR TRAVEL, SELF ALIGNING, ROTATING, RETENTION CLAMP

(75) Inventors: Joshua Gannon, Fairport, NY (US); Bruce DeMay, Webster, NY (US); Robert Bray, Webster, NY (US)

(73) Assignee: Harris Corporation, Melbourne, FL (US)

( * ) Notice: Subject to any disclaimer, the term of this patent is extended or adjusted under 35 U.S.C. 154(b) by 330 days.

(21) Appl. No.: 11/799,056

(22) Filed: Apr. 30, 2007

(65) Prior Publication Data
US 2008/0267697 A1    Oct. 30, 2008

(51) Int. Cl.
*H05K 7/14* (2006.01)
(52) U.S. Cl. ............ 403/323; 403/322.1; 403/325; 361/726; 361/679.37
(58) Field of Classification Search ............ 361/725, 361/726, 727, 679.37; 403/321, 322.1, 322.3, 403/322.4, 323, 325, 326, 327, 328, 348, 403/373; 174/50.54; 269/6, 254 CS, 3, 143, 269/249; 411/409
See application file for complete search history.

(56) References Cited

U.S. PATENT DOCUMENTS

| | | | | |
|---|---|---|---|---|
| 1,562,951 A * | 11/1925 | Franz, Jr. | ............... | 411/409 |
| 1,769,332 A * | 7/1930 | Coffing | ............... | 269/3 |
| 2,566,064 A * | 8/1951 | Keim | ............... | 361/724 |
| 2,734,410 A * | 2/1956 | Gipperich | ............... | 269/254 CS |
| 2,855,454 A * | 10/1958 | Alden | ............... | 361/726 |
| 3,012,772 A | 12/1961 | Gunzner | | |
| 3,199,938 A * | 8/1965 | Vouk | ............... | 312/333 |
| 4,118,133 A * | 10/1978 | Kupfer | ............... | 403/323 |
| 6,588,711 B2 * | 7/2003 | Onishi | ............... | 248/49 |
| 7,401,995 B2 * | 7/2008 | Senakiewich, II | ......... | 403/374.4 |

FOREIGN PATENT DOCUMENTS

EP    1498571    1/2005

* cited by examiner

*Primary Examiner* — Michael P Ferguson
(74) *Attorney, Agent, or Firm* — Harness, Dickey & Pierce, P.L.C.

(57) ABSTRACT

A retention clamp includes a shaft having a stop member and a first threaded portion, the first threaded portion including a left hand thread. A clamping member is threadably connected to the first threaded portion. A biasing member positioned between the stop member and the clamping member transfers a rotational force applied to the shaft to the clamping member to rotate the clamping member into an engagement position. An indexing member can be slidably received over the first threaded portion and positioned between the stop member and the clamping member. The indexing member is frictionally engageable with the clamping member so indexing member rotation rotates the clamping member. Both the indexing member and the clamping member can include meshable ratchet teeth to assist clamping member rotation. Legs extending transversely from the biasing member can positively engage the stop portion and the indexing member.

11 Claims, 10 Drawing Sheets

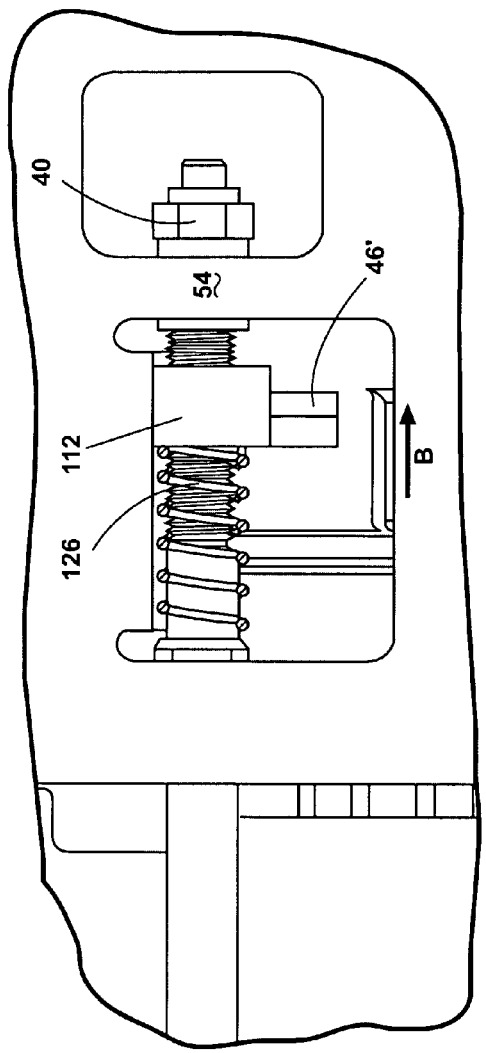
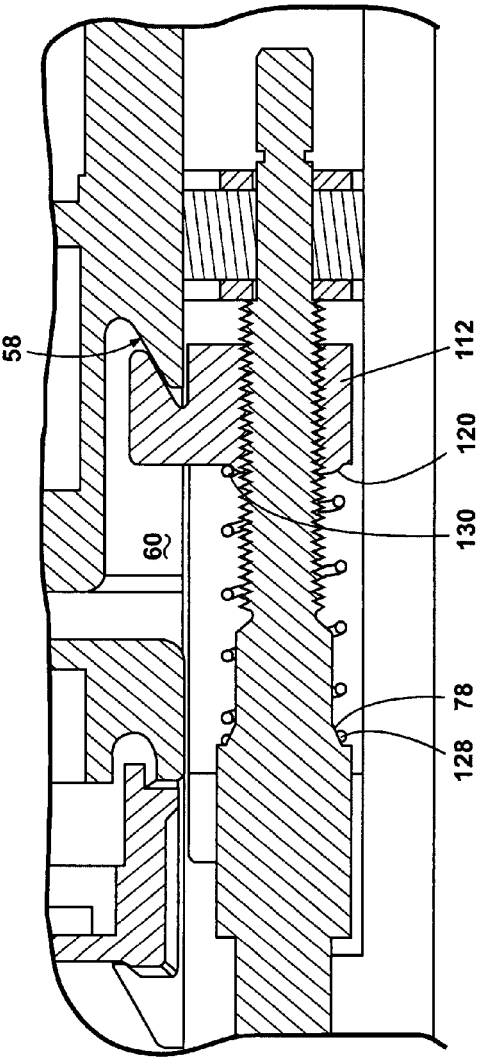
Fig. 14
Fig. 13

LINEAR TRAVEL, SELF ALIGNING, ROTATING, RETENTION CLAMP

FIELD

The present disclosure relates to clamping devices used to join a first component to a second component and a system using clamping devices.

BACKGROUND

Clamping devices are known which are used to join a first component to a second component. In some applications, a threaded rod having a threaded clamping member is rotated to drive the clamping member into engagement with a component to seat the component in an enclosure such as a cabinet, portable pack, or the like.

Difficulties with alignment of the threaded clamping member exist because of the difficulty of ensuring the clamping member aligns properly with the component. Rotating the threaded rod often positions the clamping member out-of-alignment or fails to move the clamping member to an engagement position. Existing clamping devices therefore require substantial volume within the enclosure to either manually preposition or reorient the clamping device or to properly align the clamping device. This volume either restricts the available space for the component or drives up the required volume of the enclosure.

The statements in this section merely provide background information related to the present disclosure and may not constitute prior art.

SUMMARY

According to several embodiments of a linear travel, self-aligning, rotating retention clamp of the present disclosure, a retention clamp includes a shaft having a stop member and a first threaded portion, the first threaded portion including a left hand thread. A clamping member is threadably connected to the first threaded portion. A biasing member positioned between the stop member and the clamping member is operable to transfer a rotational force applied to the shaft to the clamping member to rotate the clamping member into an engagement position.

According to additional embodiments of the present disclosure, a retention clamp includes a shaft having a stop member and a first threaded portion, the first threaded portion including a left hand thread. A clamping member is threadably connected to the first threaded portion. An indexing member is slidably received over the first threaded portion and positioned between the stop member and the clamping member. The indexing member is frictionally engageable with the clamping member such that rotation of the indexing member rotates the clamping member. A biasing member positioned between the stop member and the indexing member is operable to transfer a rotational force applied to the shaft from the stop member to the indexing member to rotate the clamping member into an engagement position.

According to further embodiments of the present disclosure, a retention clamp system includes an assembly having a shaft having a stop member and a first threaded portion, the first threaded portion including a left hand thread. A clamping member is threadably connected to the first threaded portion, the clamping member having an engagement surface angled with respect to a longitudinal axis of the shaft. A biasing member positioned between the stop member and the clamping member transfers a rotational force applied to the shaft to the clamping member to rotate the clamping member into an engagement position. An enclosure member fixedly receives the assembly. A device is received in the enclosure, the device having an engagement post adapted to engage the engagement surface of the clamping member when the shaft is rotated.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 13 is a cross sectional side elevational view of the clamp assembly of FIG. 12; and FIG. 14 is a side elevational view of the clamp assembly of FIG. 13 shown prior to engagement of the clamping hook.

DETAILED DESCRIPTION

Figure 1:
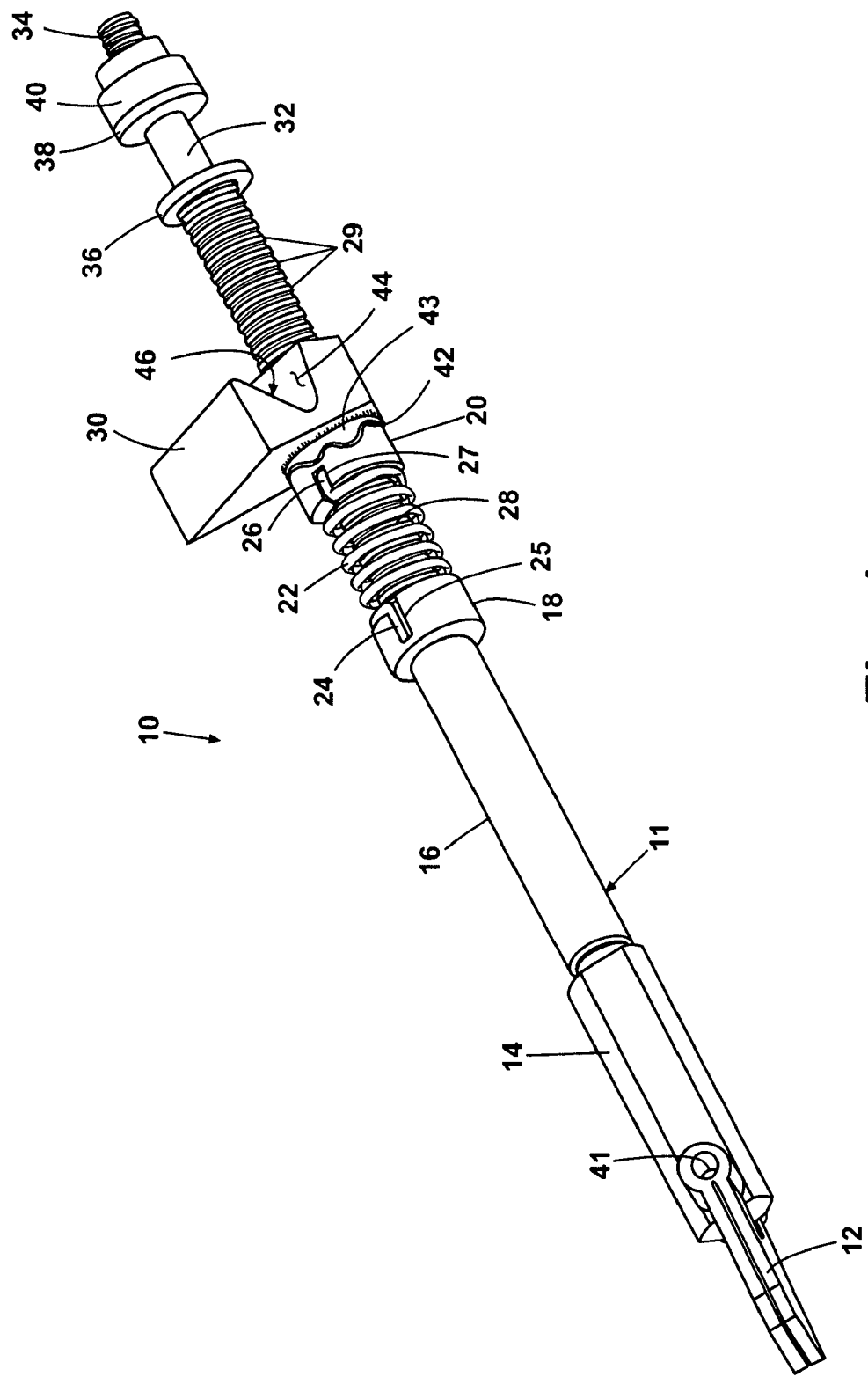
FIG. 1 is a perspective view of a clamp assembly for a linear travel, self aligning, rotating retention clamp of the present disclosure.

According to several embodiments of the present disclosure and referring generally to FIG. 1, a clamp assembly 10 includes a screw member 11 having a flap member 12 rotatably connected thereto. According to several embodiments, screw member 11 can include a drive member portion 14 provided from one of a plurality of geometric shapes which as shown in this view can include a polygonal shape having multiple sides such as the six-sided shape shown in FIG. 1. Screw member 11 can further include a shaft portion 16 connected to drive member portion 14 having a substantially circular or tubular shape, which directly transitions into a stop member 18.

An indexing member 20 can be slidably positioned proximate to stop member 18. A biasing member 22 such as a coiled compression or torsion spring can be positioned between stop member 18 and indexing member 20. According to several embodiments, biasing member 22 can include an extending rod or first leg 24 which is received in a first leg receiving slot 25 of stop member 18, and an opposed extending rod or second leg 26 received in a second leg receiving slot 27 created in indexing member 20. First leg 24 and second leg 26 of biasing member 22 provide positive rotational engagement so that a rotational force applied to screw member 11 is translated from stop member 18 by first leg 24 through biasing member 22 and through second leg 26 to indexing member 20, while biasing member 22 can extend or compress with displacement of indexing member 20.

Biasing member 22 is freely disposed over a threaded portion 28 of screw member 11. Indexing member 20 is similarly freely and slidably disposed over threaded portion 28 so that indexing member 20 is free to longitudinally slide with respect to fixed stop member 18. Threaded portion 28 is provided with a plurality of left hand threads 29. A clamping member defining a clamping hook 30 having mating internal left hand threads is threadably engaged with left hand threads 29 of threaded portion 28 and abuts indexing member 20.

Screw member 11 further includes a second shaft portion 32 positioned between threaded portion 28 and a threaded end 34. A first washer 36 and a second washer 38 are slidingly received at opposite ends of second shaft portion 32. A fastener such as a torque nut, a nut fixed with a sealing compound, or a self locking nut, hereinafter generally referred to as a self locking nut 40 is threadably engaged with threaded end 34 and abuts second washer 38 in an installed position of clamp assembly 10 which is described in further detail in reference to FIG. 2.

Flap member 12 is rotatably connected to screw member 11 using a retention pin 41. A plurality of first ratchet teeth 42 are provided at a clamping hook facing end of indexing member 20. First ratchet teeth 42 engage individual ones of a plurality of second ratchet teeth 43 provided on clamping hook 30. First ratchet teeth 42 can ratchet against second ratchet teeth 43 in response to rotation of screw member 11 which by engagement with first leg 24 and second leg 26 of biasing member 22 rotate indexing member 20 and thereby rotate clamping hook 30. Clamping hook 30 further provides a cavity 44 defining an engagement face 46.

Figure 2:
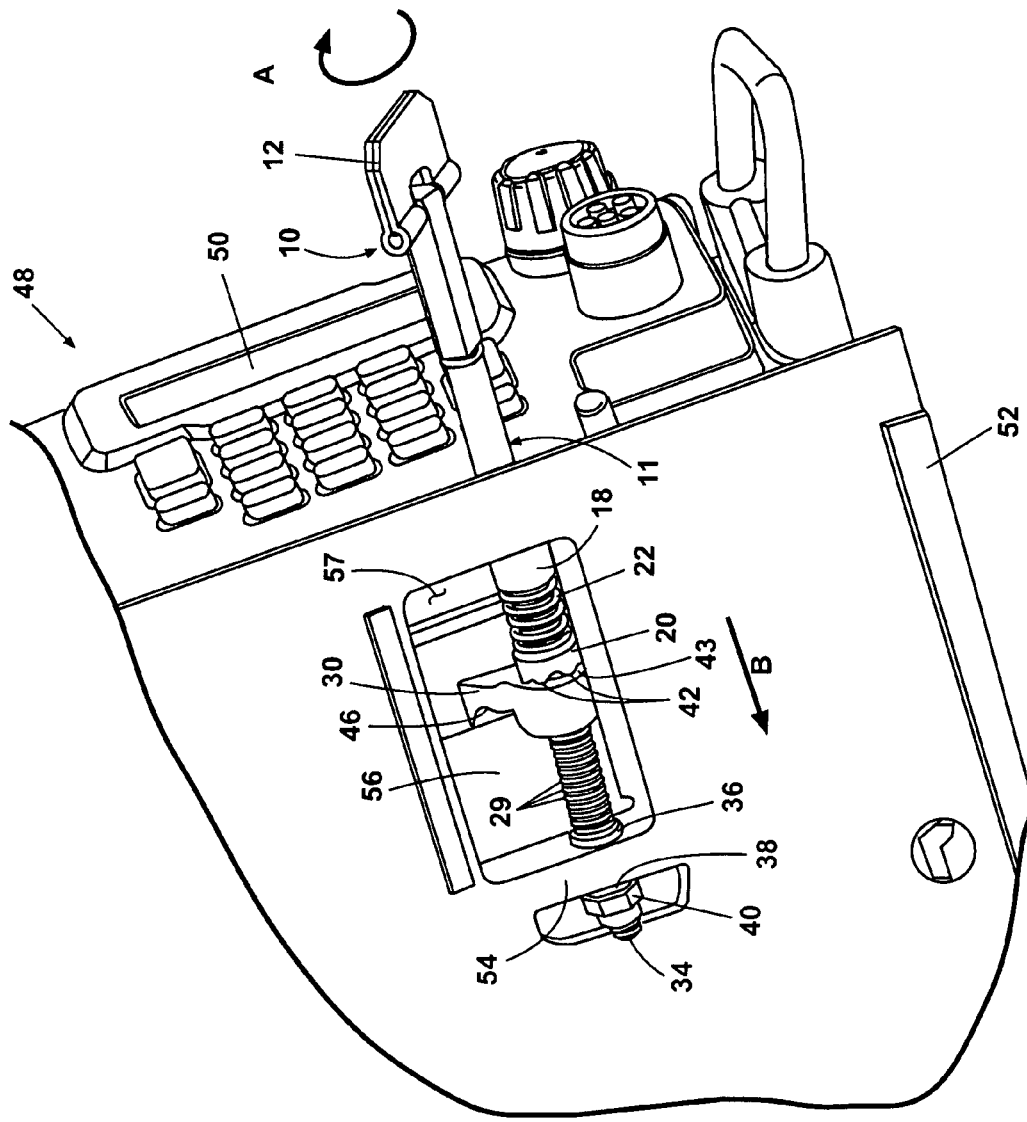
FIG. 2 is a bottom perspective view of a vehicular adapter assembly incorporating the clamp assembly of FIG. 1.

Referring now to FIG. 2, clamp assembly 10 is shown in an installed position in an assembly such as a vehicular adapter assembly 48. Vehicular adapter assembly 48 can include a communication device 50 such as a portable radio which is received within an enclosure member such as an enclosure such as a cabinet 52 and clamped using clamp assembly 10. When communication device 50 is fully seated or installed in cabinet 52, clamp assembly 10 is positioned as shown having first and second washers 36, 38 located on opposite sides of an engagement member such as a retention wall 54 of cabinet 52. Self locking nut 40 is then threadably engaged with threaded end 34 to longitudinally fix clamp assembly 10 into the position shown, while permitting rotation of screw member 11 by flap member 12.

By rotating screw member 11 using flap member 12 in a clockwise engagement rotation direction "A", stop member 18 imparts a rotation force to clamping hook 30 through biasing member 22 to rotate clamping hook 30 into the position shown. Engagement face 46 of clamping hook 30 engages with an engagement member such as an engagement wall 56 of communication device 50. Further rotation of screw member 11 in the engagement rotation direction "A" translates clamping hook 30 using left hand threads 29 in a hook engagement direction "B" to seat against engagement wall 56. During this operation, first ratchet teeth 42 of indexing member 20 rotating in response to rotational torque applied to biasing member 22 ratchet with and therefore engage opposing second ratchet teeth 43 of clamping hook 30 to position clamping hook 30 as shown in an aperture 57 of cabinet 52 for subsequent engagement of clamping hook 30 with engagement wall 56. As will be evident, flap member 12 is rotated to the position shown to maximize torque when rotating screw member 11. Flap member 12 can then be rotated (similar to the configuration shown in phantom in FIG. 6) until it contacts drive member portion 14 of screw member 11 which repositions flap member 12 to provide additional access area for communication device 50.

Figure 3:
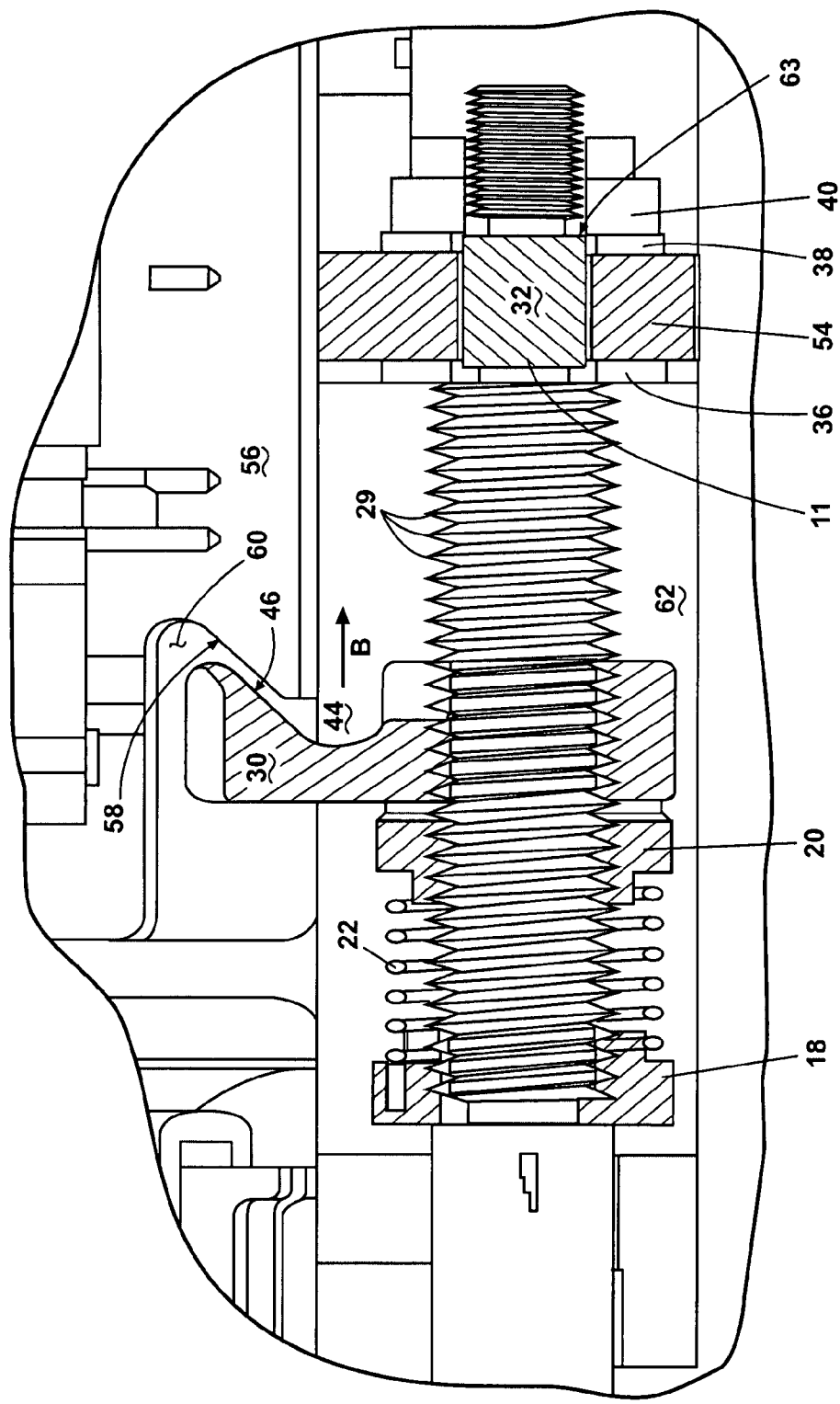
FIG. 3 is a cross sectional side elevational view of the vehicular adapter assembly of FIG. 2.

Referring now to FIG. 3, clamping hook 30 is shown positioned to allow engagement face 46 to contact an engagement face 58 defined within a body cavity 60 of engagement wall 56. Clamping hook 30 is also positioned within a clamp cavity 62 defined by both communication device 50 and cabinet 52. Clamping hook 30 is therefore free to rotate within clamp cavity 62 and must be rotated into the body cavity 60 as shown in order to permit engagement between engagement face 46 of clamping hook 30 and engagement face 58 of engagement wall 56. In the fully installed position shown, self locking nut 40 abuts a shoulder 63 of second shaft portion 32 allowing self locking nut 40 and screw member 11 to co-rotate, with self locking nut 40 able to rotate with respect to second washer 38 which is substantially fixed against rotation by contact with retention wall 54. Second washer 38 therefore acts as a rotational bearing surface for self locking nut 40. Similarly, first washer 36 is non-rotatably fixed with respect to retention wall 54. Second shaft portion 32 is diametrically sized to provide a rotational clearance fit from an inner wall of an aperture provided in retention wall 54.

Figure 4:
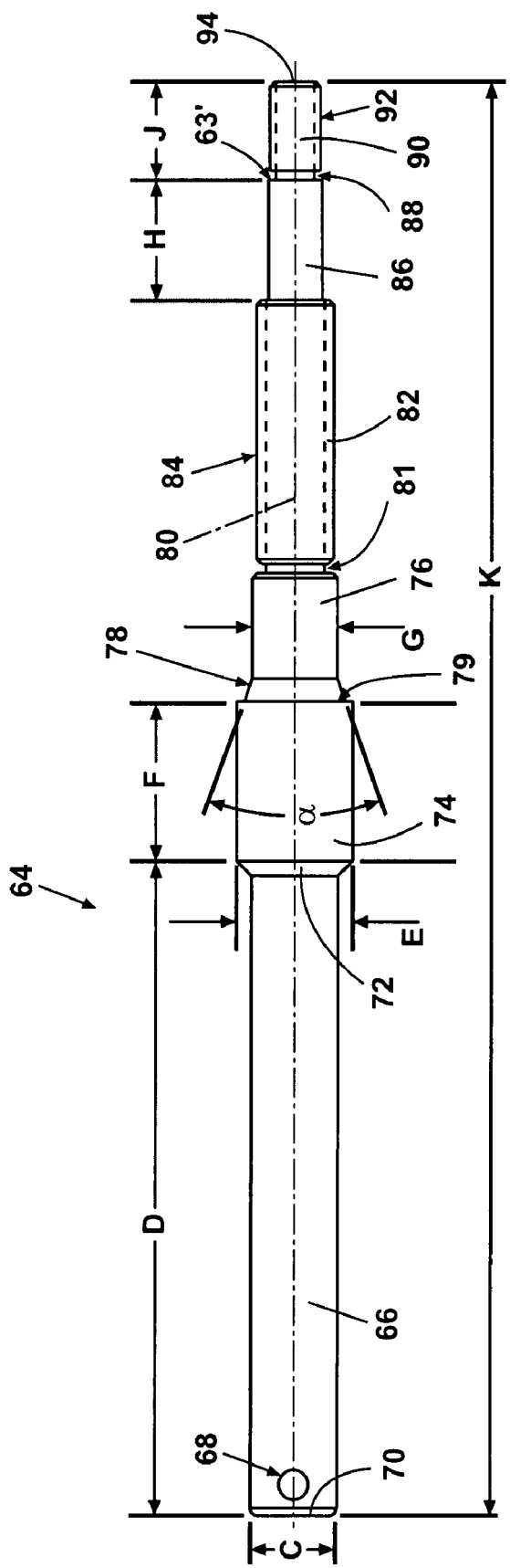
FIG. 4 is a side elevational view of another embodiment of a clamp assembly of the present disclosure.

Referring now to FIG. 4, according to additional embodiments of the present disclosure, a screw member 64 is modified from screw member 11. Screw member 64 includes a cylindrical portion 66 which replaces both drive member portion 14 and shaft portion 16 of screw member 11. Cylindrical portion 66 has a cylinder diameter "C" and a cylinder length "D" which can vary to suit the arrangement of vehicular adapter assembly 48. A pin aperture 68 is provided proximate to a first end 70 of cylindrical portion 66 to receive a retention pin. A transition portion 72 defining a tapering or a conical shape transitions from cylindrical portion 66 to a stop portion 74. Stop portion 74 is also cylindrical in shape, however, stop portion 74 includes a stop diameter "E" which is larger than cylinder diameter "C" for a function that will be described later herein. Stop portion 74 extends for a stop length "F" before transitioning into a first sleeve portion 76 via a taper portion 78. Taper portion 78 is substantially conical shaped and extends to an end face 79 of stop portion 74. End face 79 can be oriented perpendicular to a longitudinal axis 80 of screw member 64. Taper portion 78 defines an angle $\alpha$ which according to several embodiments can be approximately 40°, but can also vary between approximately 20° to approximately 120°. Stop portion 74 has a stop length "F" which can vary at the discretion of the manufacturer. First sleeve portion 76 has a sleeve diameter "G" which is sized to slidably receive a biasing member 126 (shown and described in reference to FIG. 12).

First sleeve portion 76 extends to a recessed thread stop 81 which separates first sleeve portion 76 from a threaded portion 82. Threaded portion 82 has a plurality of left hand threads 84 similar in function to left hand threads 29. A second sleeve portion 86 similar in diameter and function to second shaft portion 32 extends from threaded portion 82. Second sleeve portion 86 is unthreaded. A second recessed thread stop 88 is created between second sleeve portion 86 and a second threaded portion 90. Second threaded portion 90 has a plurality of right hand threads 92 also adapted to threadably receive self locking nut 40. Second threaded portion 90 extends to a second end 94 of screw member 64. Second sleeve portion 86 has a sleeve length "H" which corresponds approximately to a width of retention wall 54 of cabinet 52 (shown in FIG. 2) plus a combined thickness of first and second washers 36, 38. Screw member 64 has a total screw length "K" which can be the same or can vary from a length of screw member 11.

Figure 5:
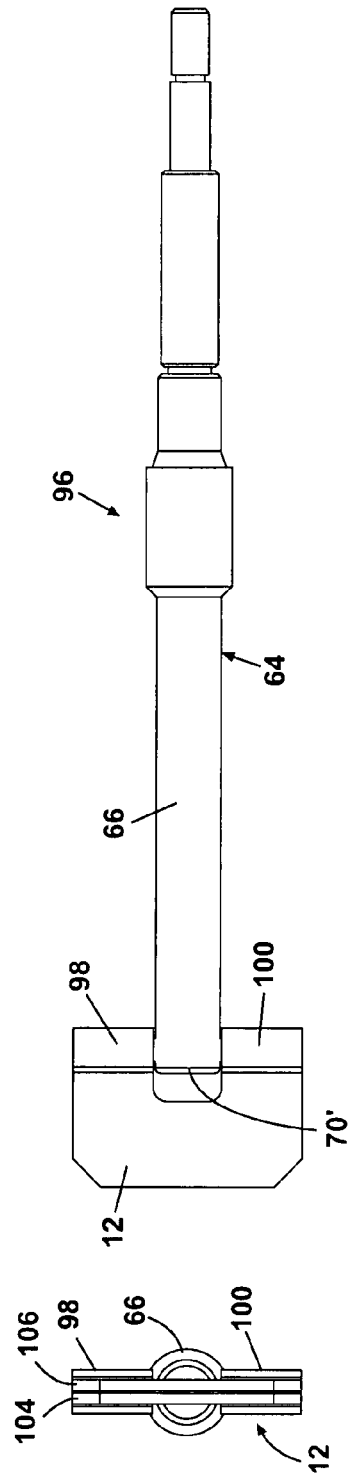
FIG. 5 is a side elevational view of a subassembly including the clamp assembly of FIG. 4 having a flap member rotatably pinned thereto.

As best seen in reference to FIG. 5, a subassembly 96 is created when flap member 12 is pinned or otherwise rotatably connected to cylindrical portion 66 of screw member 64. Flap member 12 can include each of a first and second pin receiving member 98, 100. Clearance is provided between first and second pin receiving members 98, 100 to receive first end 70' of screw member 64.

Figure 6:
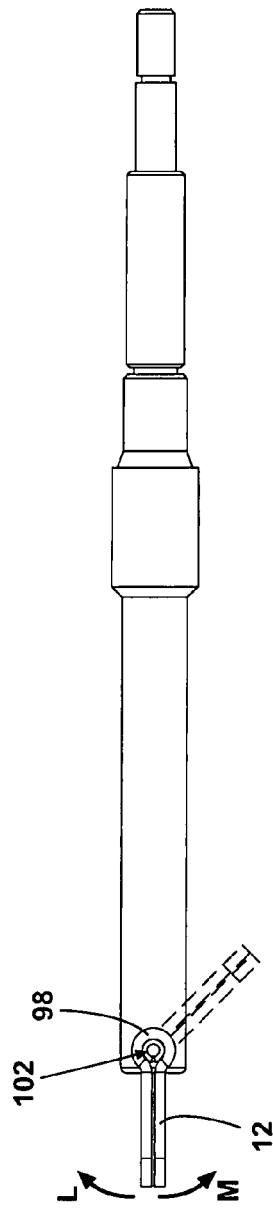
FIG. 6 is a top elevational view of the subassembly of FIG. 5.

Referring now to FIGS. 4, 5, and 6, to rotatably couple flap member 12, a retention pin 102 similar to retention pin 41 is slidably inserted into first pin receiving member 98, through pin aperture 68 of screw member 64, and then is received in second pin receiving member 100 of flap member 12. Retention pin 102 allows flap member 12 to rotate about either of a first or second rotation direction "L" or "M" from the fully extended position shown to one of two stowed positions (one shown in phantom).

Figure 7:
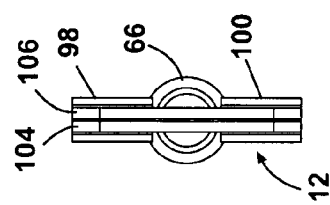
FIG. 7 is an end elevational view of the subassembly of FIG. 5.

Referring now to FIG. 7, flap member 12 is created by bending or otherwise forming a first and second wing 104, 106 about a mandrel (not shown) to create each of first and second pin receiving members 98, 100. The mandrel can have the same or a larger diameter than retention pin 102. First and second wings 104, 106 are positioned substantially in abutment with each other after forming first and second pin receiving members 98, 100.

Figure 9:
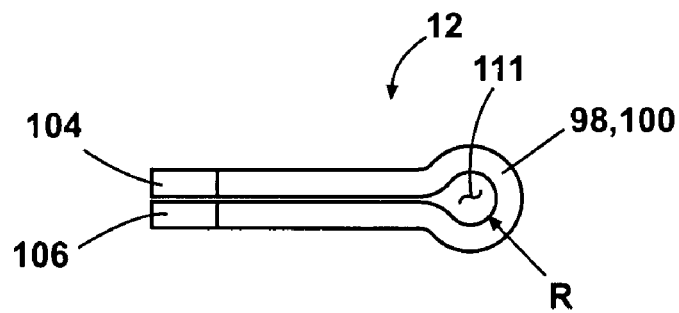
FIG. 9 is a top elevational view of the flap of FIG. 8.
Figure 8:
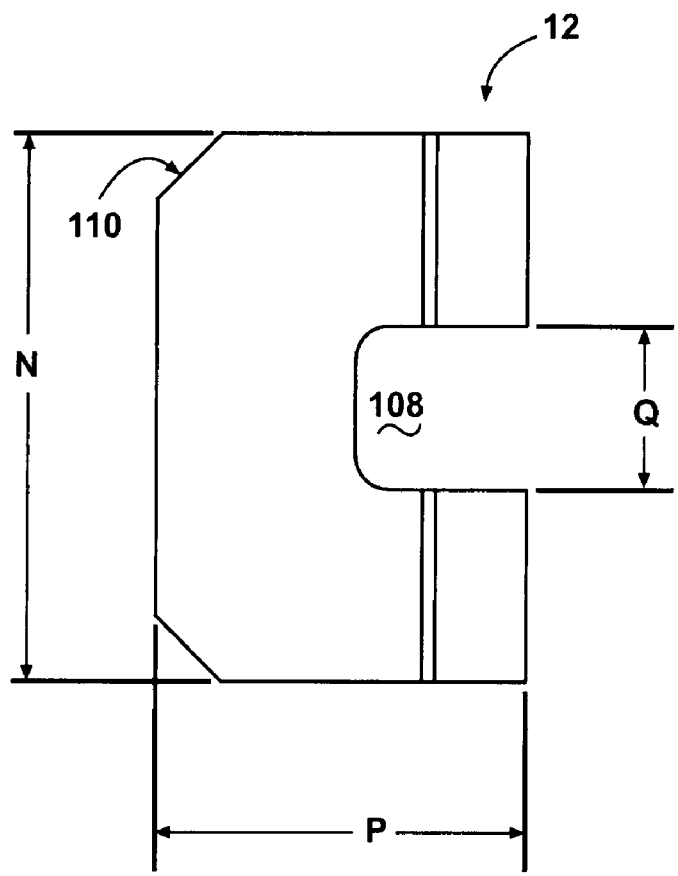
FIG. 8 is a side elevational view of a flap of the present disclosure.

Referring now generally to FIGS. 8 and 9, flap member 12 has a height "N" and a width "P" which can vary at the discretion of the manufacturer. A screw member clearance aperture 108 has a cavity height "Q" adapted to receive cylindrical portion 66 of screw member 64. Opposed corner relief(s) 110 can also be created either as substantially flat surfaces or as rounded corners of first and second wings 104, 106 to eliminate sharp edges or corners for ease of operation of flap member 12. A pin receiving aperture 111 having a pin receiving aperture diameter "R" substantially equal to or larger than a diameter of retention pin 102 (shown in FIG. 6) is created in each of first and second pin receiving members 98, 100 when they are formed. The pin receiving aperture 111 of each of first and second pin receiving members 98, 100 are co-axially aligned with each other to assist in receiving retention pin 102.

Figure 10:
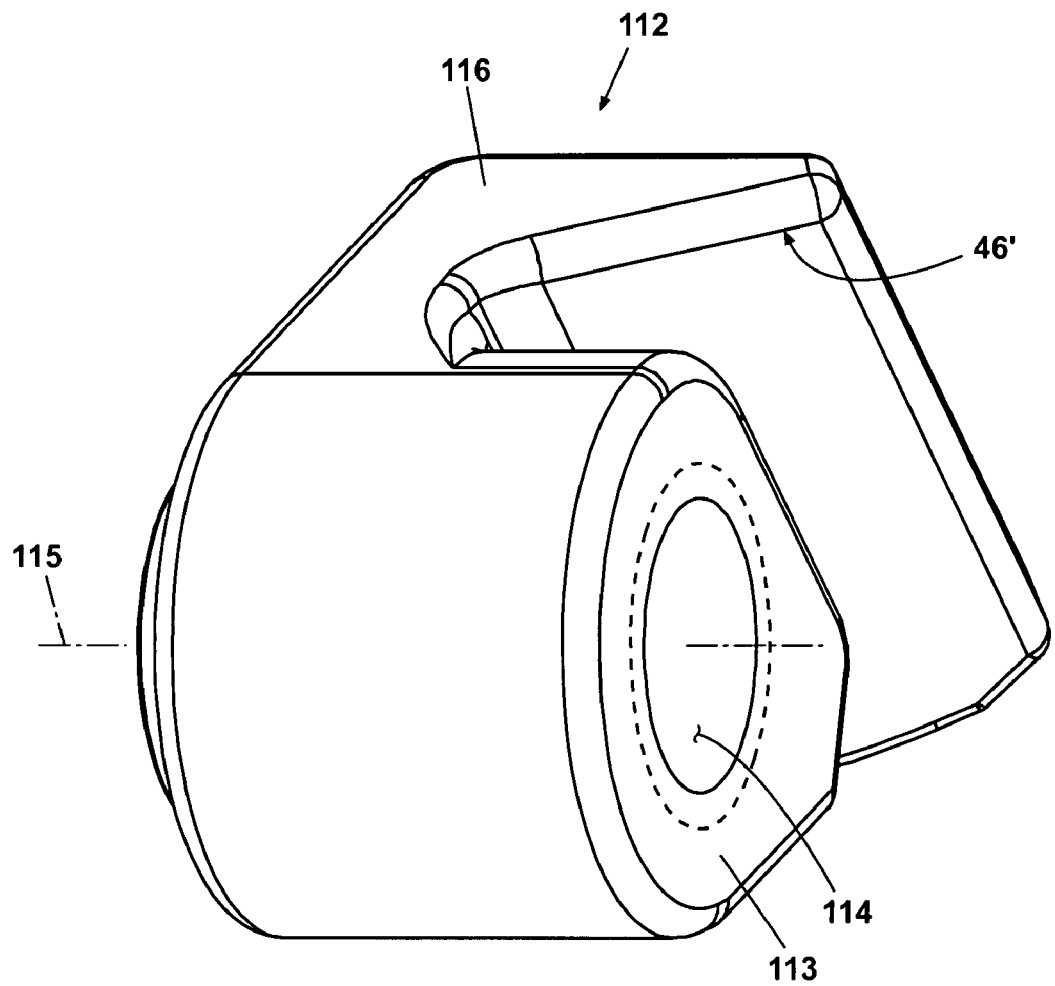
FIG. 10 is a front perspective view of a clamping hook of the present disclosure.

Referring now to FIG. 10, a clamping hook 112 is modified from clamping hook 30 and includes a body 113 having a threaded aperture 114 with female left hand threads corresponding to left hand threads 84 of screw member 64 (shown in FIG. 4). Threaded aperture 114 is created on an axis 115 which is co-axially alignable with longitudinal axis 80 of screw member 64 (shown in FIG. 4). Engagement face 46' (similar to engagement face 46 of clamping hook 30) is created in a hook member 116 extending from body 113.

Figure 11:
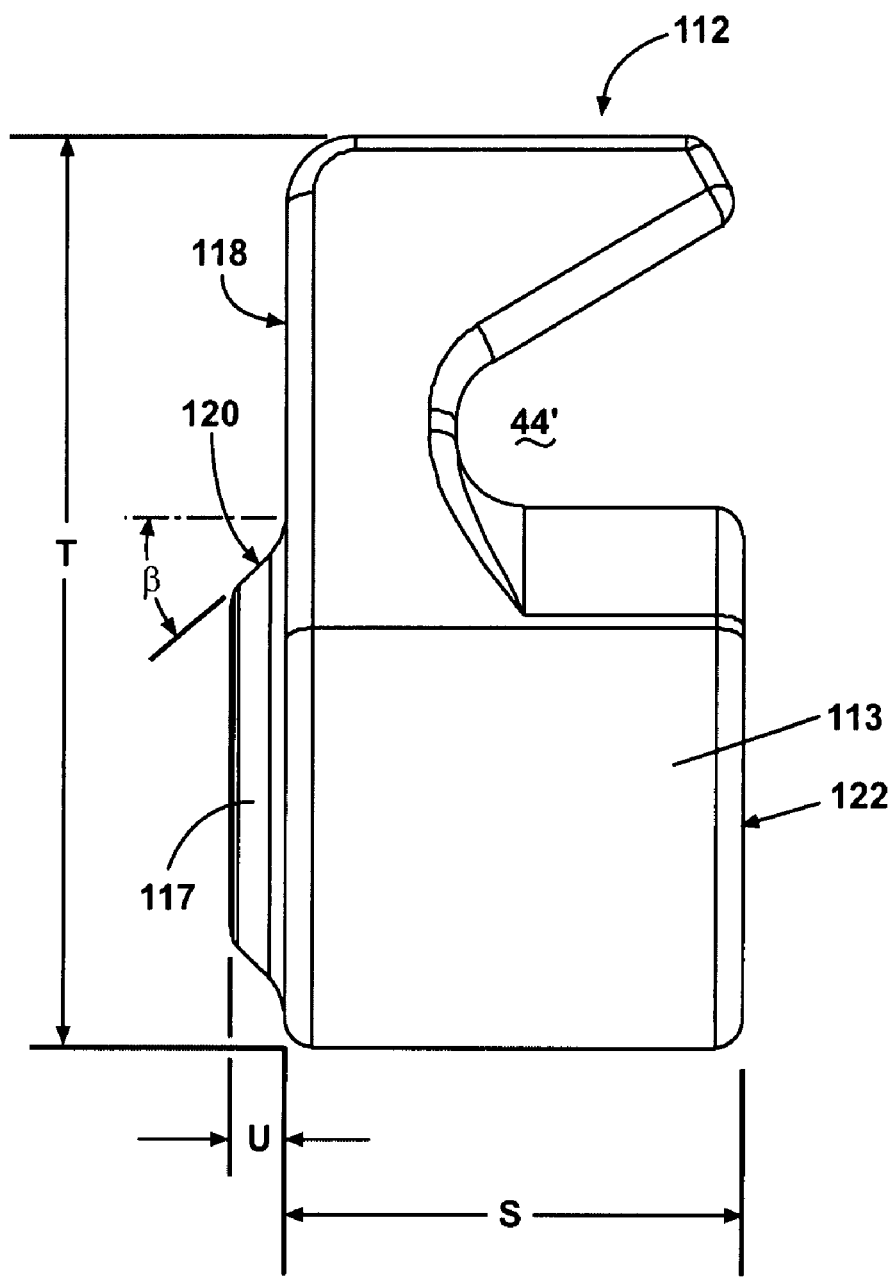
FIG. 11 is a side elevational view of the clamping hook of FIG. 10.

Referring to FIG. 11, clamping hook 112 includes a conical shaped extension 117 extending away from a first surface 118. Body 113 has a body width "S" between first surface 118 and an opposed second surface 122. Clamping hook 112 has a total height "T". Conical extension 117 has a conical extension height "U" extending with respect first surface 118. Conical extension 117 has a taper surface 120. Taper surface 120 defines a taper angle β with respect to a reference line oriented substantially perpendicular to first surface 118. According to several embodiments, taper angle β can be approximately 20°, but can also vary between approximately 10° to approximately 60° and greater at the discretion of the manufacturer.

Figure 12:
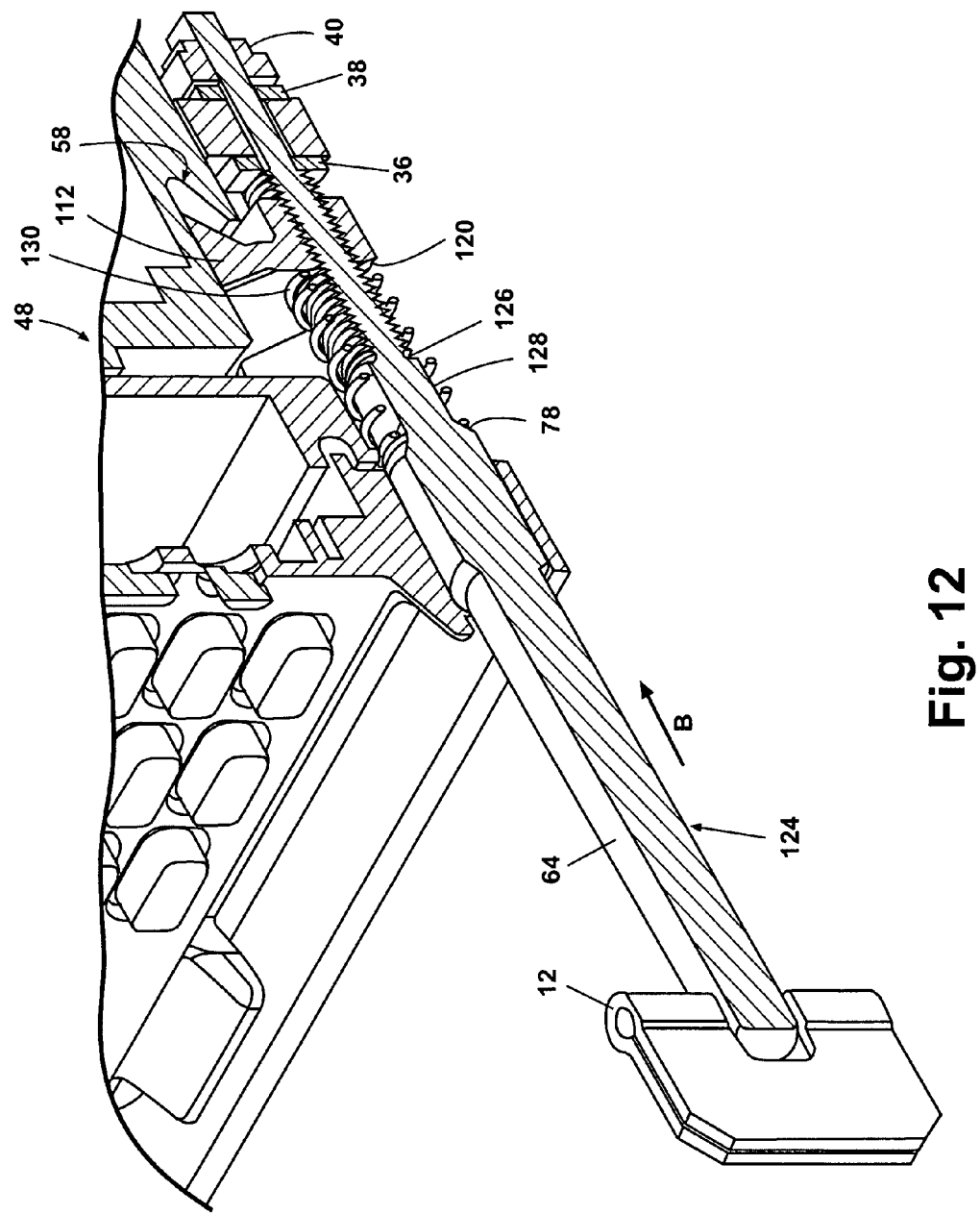
FIG. 12 is a partial cross sectional side perspective view of a clamp assembly modified from the clamp assembly of FIG. 1 installed in the vehicular adapter assembly of FIG. 2.

Referring to FIG. 12, a clamp assembly 124 is modified from clamp assembly 10. Clamp assembly 124 includes screw member 64 having flap member 12 rotatably connected thereto. Clamp assembly 124 also includes a biasing member 126 which is modified from biasing member 22 to eliminate each of first leg 24 and second leg 26. Clamp assembly 124 further includes clamping hook 112, first and second washers 36, 38 and self locking nut 40.

Operation of clamp assembly 124 is similar to operation of clamp assembly 10 with the following differences. Biasing member 126 includes a first coil end 128 which engages taper portion 78 of screw member 64. As previously discussed in reference to FIG. 4, stop member 74 has stop diameter "E" which is larger than cylinder diameter "C" to provide radially outwardly extending material to establish taper portion 78 which frictionally receives first coil end 128. Biasing member 126 also includes a second coil end 130 which engages taper surface 120 of clamping hook 112. The friction between first coil end 128 and taper portion 78 and between second coil end 130 and taper surface 120 provides the necessary frictional rotational engagement between screw member 64 and clamping hook 112 to rotate clamping hook 112 into the position shown where clamping hook 112 can engage engagement face 58 of vehicular adapter assembly 48 in the hook engagement direction "B". Taper portion 78 and taper surface 120 also provide for self-alignment of biasing member 126 to evenly and linearly distribute the rotational force imparted on screw member 64 through biasing member 126 as a combination of a rotational and a linear force to clamping hook 112.

Referring now to FIG. 13, frictional engagement of biasing member 126 to screw member 64 is provided at each of the taper portion 78 and the taper surface 120 which cause each of the first and second coil ends 128, 130 of biasing member 126 to expand radially outward with respect to the remaining coil members of biasing member 126. This frictional engagement allows the first and second legs 24, 26 of biasing member 22 to be eliminated in biasing member 126. With clamping hook 112 rotated into body cavity 60 of cabinet 52, clamping hook 112 is thereafter operable to engage engagement face 58 by rotation of screw member 64 using flap member 12.

Referring now to FIG. 14, a non-engaged orientation of clamping hook 112 is shown prior to rotation into body cavity 60. Engagement face 46' of hook member 116 is therefore positioned hanging substantially downward. Compression of biasing member 126 generating an axial force and rotation of screw member 64 create frictional engagement between screw member 64, biasing member 126, and clamping hook 112 necessary to rotate clamping hook 112 into body cavity 60 where clamping hook 112 contacts communication device 50 which stops rotation of clamping hook 112. Further rotation of screw member 64 drives clamping hook 112 in hook engagement direction "B" using left hand threads 84.

Screw members 11 and 64, flap member 12, clamping hooks 30 and 112, and indexing member 20 of the present disclosure can be made of a corrosion resistant metal, such as corrosion resistant steel, which can be passivated or precipitation hardened. Biasing members 22 and 126 can be plated music wire or stainless steel. Other corrosion resistant metals can also be used, as well as non-corrosion resistant steels having a corrosion resistant coating material such as chrome or powder coating. Dimensions referred to herein or identified generally by letter are not limiting and can vary to scale up or scale down the clamp assemblies identified herein.

Clamp assemblies of the present disclosure offer several advantages. By using clamping hooks which can be positively or frictionally rotated by a biasing member, the clamping hooks can be positioned in multiple orientations on a threaded portion of the screw member, allowing the clamp assembly to be positioned in a corner or peripheral location about the cabinet. The biasing member also provides for reverse rotation of the clamping hook if necessary, to permit removal of the clamp assembly. Taper and conical surfaces which are used in conjunction with the biasing member in several embodiments allow the use of standard end-ground coil springs for the biasing members. Taper and conical surfaces described herein also promote self-alignment of the biasing members which promotes evenly-loaded, linear travel of the clamping hook to align the clamping hook for engagement.

The above description is merely exemplary in nature and is not intended to limit the present disclosure, application, or uses.

What is claimed is:

1. A retention clamp system, comprising:
    an assembly including:
        a shaft having a stop member, a drive member portion and a first threaded portion, the first threaded portion including a left hand thread;
        a clamping member having a body with a hook extending from the body, the hook having a tapered engagement face, the body having internal left hand threads threadably connected to the first threaded portion, the tapered engagement face angled with respect to a longitudinal axis of the shaft and facing away from the drive member portion of the shaft; and
        a biasing member positioned between and in frictional contact with both the stop member and the clamping member operating by the frictional contact to transfer a rotational force applied to the shaft to the clamping member to rotate the clamping member into an engagement position;
    an enclosure member having a peripheral wall to which the shaft is rotatably connected, the peripheral wall defining an enclosure cavity and a clamp cavity which receives the assembly; and
    a device received in the enclosure cavity of the enclosure member and releasably retained by the clamping member by operation of the assembly, the device having:
        an internal body cavity, the hook of the clamping member initially positioned in the clamp cavity of the enclosure member, the clamping member rotatable by rotation of the shaft transferring the rotational force to the clamping member through the biasing member to rotate the hook from the clamp cavity into the body cavity of the device; and
        an engagement wall created in the body cavity contacted by the tapered engagement face of the clamping member after the hook is rotated into the body cavity by a clockwise rotation of the shaft moving the clamping member away from the drive member portion to engage the tapered engagement face with an engagement face of the engagement wall to establish the engagement position, and releasably retain the device within the enclosure member, wherein an opposite rotation of the shaft releases the hook from the engagement face of the engagement wall.

2. The retention clamp system of claim 1, further comprising:
    a second threaded portion of the shaft having a nut threaded thereon to rotatably engage the shaft to the enclosure member; and
    a non-threaded sleeve portion of the shaft located between the first and second threaded portions operable as a rotational bearing surface for the shaft when positioned in a receiving aperture of the enclosure member; and
    a recessed thread stop positioned between the first and second threaded portions of the shaft, the recessed thread stop defining a shoulder adapted to abuttingly engage the nut in a nut fully installed position, the nut in the fully installed position being substantially fixed for co-rotation with the shaft.

3. The retention clamp system of claim 1, further comprising:
    a taper portion of the stop member operable to frictionally engage a first end of the biasing member; and
    a taper surface of the clamping member operable to frictionally engage a second end of the biasing member, the taper portion and taper surface together cooperating to provide for self-alignment of the biasing member to evenly and linearly distribute a rotational force imparted on the shaft as a combination of a rotational and a linear force to the clamping member.

4. A retention clamp system, comprising:
    a shaft having in sequential order:
        a drive member portion;
        a stop member;
        a first threaded portion having a left hand thread;
        an unthreaded sleeve portion; and
        a second threaded portion;
    a clamping member having a body with a hook extending from the body and internal left hand threads threadably connected to the first threaded portion;
    a biasing member positioned between and in frictional contact with both the stop member and the clamping member, the biasing member operating by the frictional contact to frictionally transfer a rotational force applied to the drive member portion to rotate both the shaft and the clamping member;
    a cabinet having a peripheral wall defining an enclosure cavity and a clamp cavity into which the shaft extends and a retention wall, the sleeve portion extending through and past the retention wall and the second threaded portion extending beyond the retention wall;
    a nut threadably engaged on the second threaded portion abutting the unthreaded sleeve portion to rotatably engage the shaft to the cabinet and position the shaft in the clamp cavity;
    a device slidably received in the enclosure cavity of the cabinet and releasably connected to the cabinet using the clamping member, the device having:
        an internal body cavity created in a device body wall, the hook of the clamping member initially positioned in the clamp cavity, the clamping member rotatable by rotation of the shaft transferring the rotational force to the clamping member through the biasing member to rotate the hook from clamp cavity into the internal body cavity of the device and into contact with the device, stopping further rotation of the clamping member; and
        an engagement wall created on the device body wall and located in the body cavity, the engagement wall contacted by the hook to engage the clamping member to the device by further rotation of the shaft after the clamping member enters the internal body cavity thereby releasably connecting the device to the cabinet, the clamping member released from the device by an opposite rotation of the shaft moving the hook away from the engagement wall and rotating the hook into the clamp cavity.

5. The retention clamp system of claim 4, wherein the shaft further comprises:
   first and second washers positioned on the unthreaded sleeve portion and oppositely located about the cabinet retention wall permitting the nut to be releasably fixed for rotation with the shaft.

6. The retention clamp system of claim 4, wherein the biasing member contacts a taper portion of the stop member and a taper surface of the clamping member to frictionally transfer the rotational force applied to the shaft to the clamping member to rotate the clamping member for engagement of the clamping member to the device.

7. The retention clamp system of claim 4, wherein the shaft further includes a first shaft portion defining a cylindrical portion, having the stop member connected to the cylindrical portion, the first threaded portion extending from the stop member oppositely with respect to the cylindrical portion.

8. The retention clamp system of claim 7, wherein the body of the clamping member is movable away from the cylindrical portion and toward the nut by a clockwise rotation of the shaft to releasably engage the device between the clamping member and the retention wall, contact between the engagement face and the engagement wall being the only contact between the clamping member and the device.

9. The retention clamp system of claim 7, wherein the stop member includes a stop diameter which is larger than a cylindrical portion diameter.

10. The retention clamp system of claim 4, wherein the hook defines a cavity with a tapered engagement face within the cavity of the hook, the tapered engagement face of the hook contacting the engagement wall.

11. A retention clamp system, comprising:
   an enclosure member having a retention wall and a peripheral wall defining an enclosure cavity;
   a device received and releasably retained in the enclosure cavity of the enclosure member in an engagement position;
   an assembly including:
      a shaft positioned in the enclosure cavity and rotatably connected to the retention wall by access through a cavity of the peripheral wall after the device is positioned in the enclosure cavity, the shaft having a stop member, a drive member portion and a first threaded portion having a left hand thread;
      a clamping member including a hook having a tapered engagement face and internal left hand threads threadably connected to the first threaded portion with the tapered engagement face facing away from the drive member portion; and
      a biasing member positioned between and in frictional contact with both the stop member and the clamping member to frictionally transfer a rotational force applied to the shaft to the clamping member to rotate the clamping member; and
   the device including:
      an internal body cavity, the clamping member rotated by a clockwise rotation of the shaft to rotate the hook through the cavity of the peripheral wall and into the body cavity of the device; and
      an engagement wall created in the body cavity contacted by the tapered engagement face of the hook after the hook is rotated through the cavity of the peripheral wall and into the body cavity by continued clockwise rotation of the shaft moving the clamping member away from the drive member portion along the first threaded portion to engage the tapered engagement face with an engagement face of the engagement wall to establish the engagement position, wherein an opposite rotation of the shaft releases the hook from the engagement face of the engagement wall.

* * * * *